(12) United States Patent
Bohacek et al.

(10) Patent No.: US 11,314,554 B2
(45) Date of Patent: Apr. 26, 2022

(54) SYSTEM AND METHOD FOR GROUPING NODES BY ANALYZING AND ASSOCIATING NODES OF A COMPUTER SYSTEM BY SHARED CHARACTERISTICS

(71) Applicant: Cloudamize, Inc., Philadelphia, PA (US)

(72) Inventors: Stephan Karl Bohacek, Philadelphia, PA (US); Khushboo Shah Bohacek, Philadelphia, PA (US)

(73) Assignee: Cloudamize, Inc., Philadelphia, PA (US)

( * ) Notice: Subject to any disclaimer, the term of this patent is extended or adjusted under 35 U.S.C. 154(b) by 75 days.

(21) Appl. No.: 16/464,051

(22) PCT Filed: Nov. 28, 2017

(86) PCT No.: PCT/US2017/063465
§ 371 (c)(1),
(2) Date: May 24, 2019

(87) PCT Pub. No.: WO2018/098478
PCT Pub. Date: May 31, 2018

(65) Prior Publication Data
US 2019/0286491 A1    Sep. 19, 2019

Related U.S. Application Data

(60) Provisional application No. 62/426,929, filed on Nov. 28, 2016.

(51) Int. Cl.
*G06F 9/50*    (2006.01)

(52) U.S. Cl.
CPC ...... *G06F 9/5061* (2013.01); *G06F 2209/505* (2013.01)

(58) Field of Classification Search
CPC ................ G06F 9/5061; G06F 2209/505
(Continued)

(56) References Cited

U.S. PATENT DOCUMENTS 6,393,387 B1 * 5/2002 Adriaans ............. G06F 11/3495
703/27
7,231,395 B2 * 6/2007 Fain ..................... G06F 16/951
(Continued)

OTHER PUBLICATIONS

International Search Report dated Feb. 15, 2018 for International Application No. PCT/US2017/063465.
(Continued)

*Primary Examiner* — Meng Ai T An
*Assistant Examiner* — Hsing Chun Lin
(74) *Attorney, Agent, or Firm* — Fisherbroyles, LLP

(57) ABSTRACT

A node grouping system for grouping a plurality of nodes of a computer system, includes: a processor; a memory operatively coupled to the processor; a node aggregator component comprising instructions stored in the memory and operable to cause the system, under control of the processor, to group the plurality of nodes by: comparing first characteristics of a first node of the plurality of nodes with first grouping criteria of a first group to determine if the first characteristics satisfy the first grouping criteria; grouping the first node with the first group based on a determination that the first characteristics satisfy the first grouping criteria; and storing the grouping within the memory; and an interface component comprising instructions stored in the memory and operable to cause said system, under control of the processor, to display the grouping comprising the first node.

22 Claims, 9 Drawing Sheets

(58) Field of Classification Search
USPC .......................................................... 718/104
See application file for complete search history.

(56) References Cited

U.S. PATENT DOCUMENTS

| | | | |
|---|---|---|---|
| 8,095,929 B1 * | 1/2012 | Ji | G06F 9/4856 718/1 |
| 2003/0035380 A1 | 2/2003 | Downing | |
| 2007/0282985 A1 * | 12/2007 | Childress | G06F 9/5061 709/223 |
| 2011/0055755 A1 * | 3/2011 | Chen | G06Q 10/10 715/810 |
| 2012/0054363 A1 | 3/2012 | Hart | |
| 2016/0094477 A1 | 3/2016 | Bai | |

OTHER PUBLICATIONS

International Preliminary Report on Patentability dated May 28, 2019 for International Application No. PCT/US2017/063465.
Written Opinion of the International Searching Authority dated Feb. 15, 2018 for International Application No. PCT/US2017/063465.
UK Examination Report dated Sep. 1, 2021 in Application No. GB109313.7.
UK Intention to Grant under Section 18(4) dated Nov. 10, 2021 in Application No. GB109313.7.
UK Examination Report dated Jun. 4, 2021 in Application No. GB109313.7.

* cited by examiner

400

SYSTEM AND METHOD FOR GROUPING NODES BY ANALYZING AND ASSOCIATING NODES OF A COMPUTER SYSTEM BY SHARED CHARACTERISTICS

CROSS-REFERENCE TO RELATED APPLICATIONS

This application is a national stage application of International Application No. PCT/US2017/063465, filed Nov. 28, 2017, which claims the benefit of priority of U.S. Provisional Patent Application No. 62/426,929, filed Nov. 28, 2016, the entire disclosure of both of which are hereby incorporated herein by reference.

FIELD OF INVENTION

The present invention relates generally to computer analytics and more particularly to a system and method for analyzing the software and hardware aspects of a computer system in support of modifying the infrastructure of the computer system.

BACKGROUND

Current computer systems are very complicated and include a variety of programs all having different requirements and that may span multiple different computing devices. The complexity is particularly acute in the context of an enterprise system in which it is very difficult to understand which programs are running within the system, as well as the details and requirements of those programs, and to facilitate changes to the programs or the related infrastructure. To further complicate matters, the services provided by infrastructure providers are complex and rapidly changing.

Routinely, changes to one or more aspects of a computer system are implemented. These changes may include changes to software, hardware, bandwidth elements, and/or changes to other aspects of the system. In various instances, these changes may be made in concert, where changes to one aspect may require changes to another aspect. For example, upgrading software may necessitate changes to hardware and/or bandwidth elements of the computer system. In another example, changes to the cost efficiency of a computer system may require changes to the other aspects of the computer system. In some instances, software and/or hardware elements of the system may be changed to take advantage of commercially-available services. These services may provide data storage, management and processing through the use of at least one remote server. In order to support upgrading or changing one or more elements of a computer system, it is helpful to have a robust understanding of the programs, information and capabilities of the computer system as well as how any changes or upgrades will affect the computer system.

One example of a commercially-available service is a cloud computing infrastructure. Cloud computing infrastructures may help reduce long-term infrastructure cost and reduce the complexity of managing a large local computer system. However, moving computer systems to a cloud computing infrastructure is complicated as there are various providers with different services and it is difficult to understand the requirements of the aspects of the computer system that are to be migrated to the cloud computing infrastructure. Accordingly, developing an effective, efficient and/or workable plan for migration is a complex task that is prone to errors and sub-optimization. One aspect of generating a migration plan includes grouping aspects of a computer system having common attributes to improve the efficiency of the migration and reduce incompatibilities after migration. Current solutions include a manual review of several thousand machines within a computer system to understand the programs and hardware that are to be moved. Further, current solutions include a manual comparison of the aspects of the computer system with the features of various cloud services. This is a complex and inexact process and may lead to unforeseen incompatibilities when a new infrastructure in chosen. As such, there would be a significant benefit received from a system capable of automatedly reviewing the programs and hardware of the machines of a computer system to form groups of machines and applications having one or more common attributes, such as having similar processor and/or networking requirements, in support of manual development a cloud migration plan. However, there are no current systems that are able to perform an automated review of the programs and hardware of the machines of a computer system to groups. Further, there are no current systems that are able to generate groupings of machines and applications of a computer system and a migration plan based on those groupings.

Current systems are only able to provide basic information related to the computer system and do not group machines and applications of the computer system to aid in the generation of a migration plan. Further, current systems do not allow a user to define the criteria used to group the machines of the computer system. Since current systems are deficient in grouping machines of the computer system, this process must often be completed by manual review, which is time-consuming, complex, error-prone, and subject to sub-optimization.

DESCRIPTION OF THE FIGURES

An understanding of the following description will be facilitated by reference to the attached drawings, in which.

DETAILED DESCRIPTION

The following describes systems and methods for evaluating and grouping machines and/or applications (collectively referred to herein after as nodes) of a computer system, e.g., in support of migration between network computing infrastructures.

In various embodiments, the process of developing a migration or transition plan may be improved with a better understanding of the relationship between the programs and hardware of the computer system to be updated. Updating the computer system may include migrating or transitioning at least a portion of the computer system to a new infrastructure. For example, a computer system may be migrated from a local server infrastructure to a cloud based infrastructure.

The following description describes a novel system for analyzing nodes of a computer system and determining interrelationships and/or other associations between the nodes to improve the efficiency and reduce errors when migrating to a new infrastructure. For example, nodes that access a similar database and nodes that comprise similar software may be grouped together. Previous systems are unable to review the program and/or hardware of machines of the computer system to provide information to aid in associating the aspects of the computer system. Previous systems required a detailed manual review and association of the aspects of the computer system which is inefficient and/or impossible to perform effectively, and may lead to potential incompatibilities. Further, in various embodiments, the described system is capable of performing an automated grouping of the nodes of the computer system. This differs from previous systems that relied upon a manual review and grouping.

Figure 1:
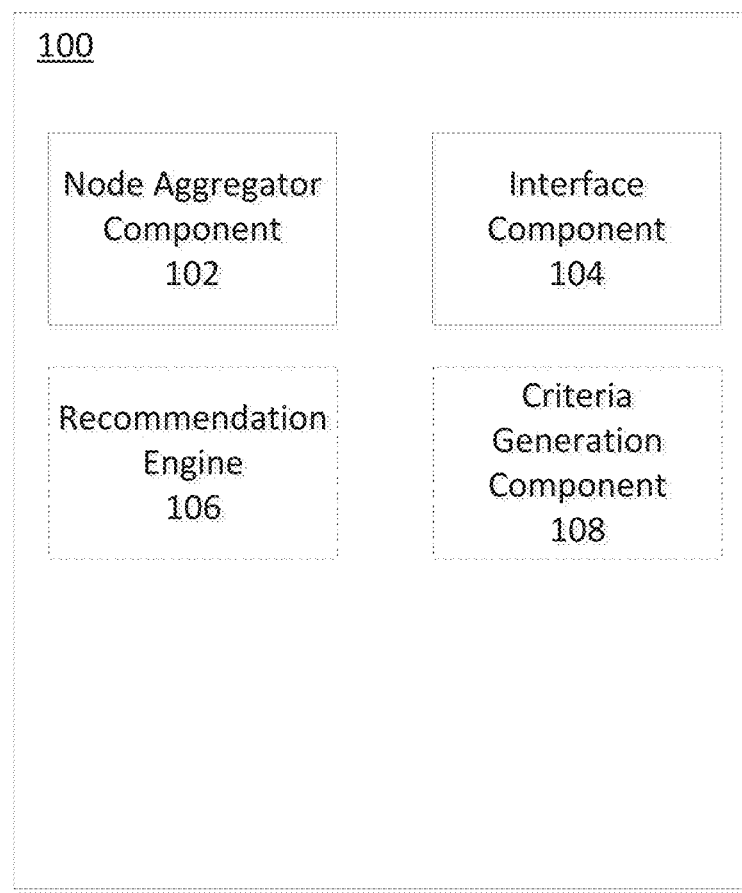
FIG. 1 is a block diagram of an exemplary node grouping system in accordance with the present invention.

FIG. 1 is a system diagram showing a node grouping system 100 in accordance with the present invention. Referring now to FIG. 1, node grouping system 100 comprises a node aggregator component 102 and an interface component 104. Node aggregator component 102 is configured to receive characteristics for a plurality of nodes and grouping criteria and to determine how the nodes should be grouped. The grouped nodes may be formatted and displayed on a display device as part of a graphical user interface (GUI) element through the use of interface component 106. Optionally, node grouping system 100 further includes a recommendation engine 106 that is configured to determine a migration plan based on the groupings of the nodes and a criteria generation component 108 that is configured to determine criteria for grouping the nodes from available characteristics.

As used herein, node grouping system 100 refers to one or more computing devices configured to group nodes to gain an enhanced understanding of the parameters of a computer system. The node grouping system 100 may comprise any combination of hardware and software aspects of a conventional general purpose computing system, but also further includes instructions for configuring the node grouping system 100 with rules and/or logic as a special-purpose computer system in accordance with the present invention. In one embodiment, node grouping system 100 comprises computer executable instructions stored on a tangible memory of the system, and the computer executable instruction are executed by a processor within node grouping system 100 to communicate with a memory and/or network element to obtain node characteristics and grouping criteria used to group the nodes. Node grouping system 100 compares the characteristics for each node with the criteria for each group to create groups of nodes. Node grouping system 100 may also receive grouping (or association) rules which may further define how the nodes are to be grouped. In various embodiments, node grouping system 100 is configured to generate a display of grouped node information and/or to receive input from a user.

Throughout the disclosure, the term machine may be used, where machine is meant to be a computing system that can be either a virtual machine, container, a physical machine, or set of homogeneous machines. A machine can also be a description (such as a set of instructions or a configuration) that can be used to make a machine. In various embodiments, a machine is not an actual machine or description, but is a planned machine or description of a machine. For example, engineering drawings and other plans for a machine may be referred to as a machine.

A set of programs or descriptions (such as a configuration file) that run on one or more computer system may be referred to as an application. As with the definition to machine above, an application can be an actual application on a computer system, or it can be a planned application.

The term node may be used to refer to any combination of machines and corresponding hardware and programs. In one embodiment a node may be comprised of only hardware or software. In another embodiment, a different nodes may comprise different combinations of hardware and software. For example, a first node may be comprised of only hardware aspects of machines of a computer system, while a second node may be comprised of hardware and software aspects of machines of the computer system. In various embodiments nodes run on various computer system, such as the computer systems comprising datacenters or cloud computer systems. In one embodiment, there may be a project or task to move one or more nodes from a first infrastructure to a second infrastructure. For example, there may be a project to move a node from a local server to a cloud computing infrastructure. In another example, there may be a project to move a node between cloud computing infrastructures. Projects that involve moving nodes may be referred to as migration projects. For a planned node, where the node does not yet exist on computer system, migration may refer to deploying the planned node on a computer infrastructure. Node migration may also refer to upgrading the nodes, which includes implementing new software, purchasing (or leasing) new hardware, and similar changes to the nodes.

In various embodiments, the node grouping system collects and displays a wide range of information about node for assessment of the node. In one embodiment, node grouping system 100 assesses the node by receiving a wide range of data about machines and/or applications, processing the corresponding information, and presenting the information for visualization (either through a graphical user interface or through an API). The information may be specifically focused on data useful for planning and performance node migration.

Figure 2:
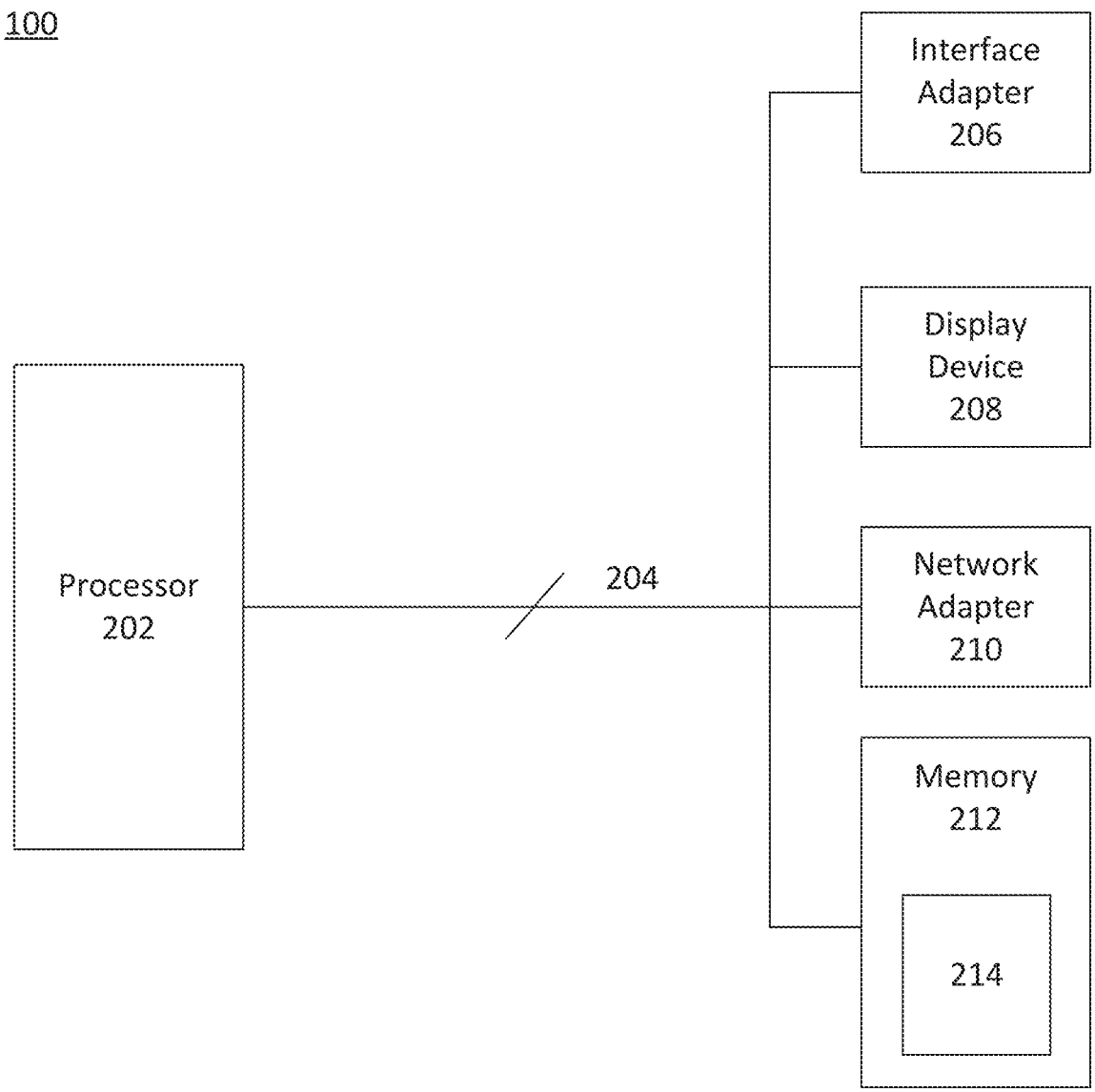
FIG. 2 is a block diagram illustrating an exemplary node grouping system in accordance with the present invention.

FIG. 2 is a block diagram of a node grouping system 100 in accordance with the present invention. Node grouping system 100 includes conventional computer hardware storing and/or executing specially-configured computer software that configures the hardware as a particular special-purpose machine having various specially-configured functional sub-components that collectively carry out methods in accordance with the present invention. Accordingly, node grouping system 100 of FIG. 2 includes a general purpose processor 202 and a bus 204 employed to connect and enable communication between the processor 202 and the components of the node grouping system 100 in accordance with known techniques. The node grouping system 100 typically includes a user interface adapter 206, which connects the processor 202 via the bus 204 to one or more interface devices, such as a keyboard, mouse, and/or other interface devices, which can be any user interface device, such as a touch sensitive screen, digitized entry pad, etc. The bus 204 also connects a display device 208, such as an LCD screen or monitor, to the processor 202 via a display adapter. The bus 204 also connects the processor 202 to memory 212, which can include a hard drive, diskette drive, tape drive, etc.

The node grouping system 100 may communicate with other computer systems, for example via a communication channel, network adapter 210. The node grouping system 100 may be associated with such other computer systems in a local area network (LAN) or a wide area network (WAN), and operates as a server in a client/server arrangement with another computer, etc. Such configurations, as well as the appropriate communications hardware and software, are known in the art.

The node grouping system 100 software is specially configured in accordance with the present invention. Accordingly, as shown in FIG. 2, the node grouping system 100 includes computer-readable, processor-executable instructions 214 stored in the memory 212 for carrying out the methods described herein. For example, memory 212 comprises processor-executable instructions corresponding to one or more of node aggregator component 102 and interface component 104, as discussed in greater detail below.

Memory 212 may be configured to store data received by or generated from one or more of the components. For example, memory 212 may store node characteristics and grouping criteria received by node grouping system 100 via network 210. By way of example, node characteristics may include one or more of suitability for migration, processor utilization, network bandwidth requirements, software versions, and the like. Memory 212 may be further configured to store grouping information determined by node aggregator component 102. For example, node aggregator component 102 may store the Boolean values determined from the comparison of the node characteristics and grouping criteria in memory 212.

A computer program product stored on a tangible computer-readable medium for carrying out the methods identified above is provided also. The computer program product comprises computer readable instructions for carrying out the methods described herein. In one embodiment, an exemplary computer program product comprises a tangible computer-readable medium storing a software application comprising a first instruction set for causing a computing device to provide primary application functionality, and a second instruction for causing the computing device to provide access to a defined operational mode only after receipt of configuration settings from a back-end server, the configuration settings configuring the software application to enter the defined operational mode in response to receipt of predefined user input via an input device of the computing device.

Figure 3:
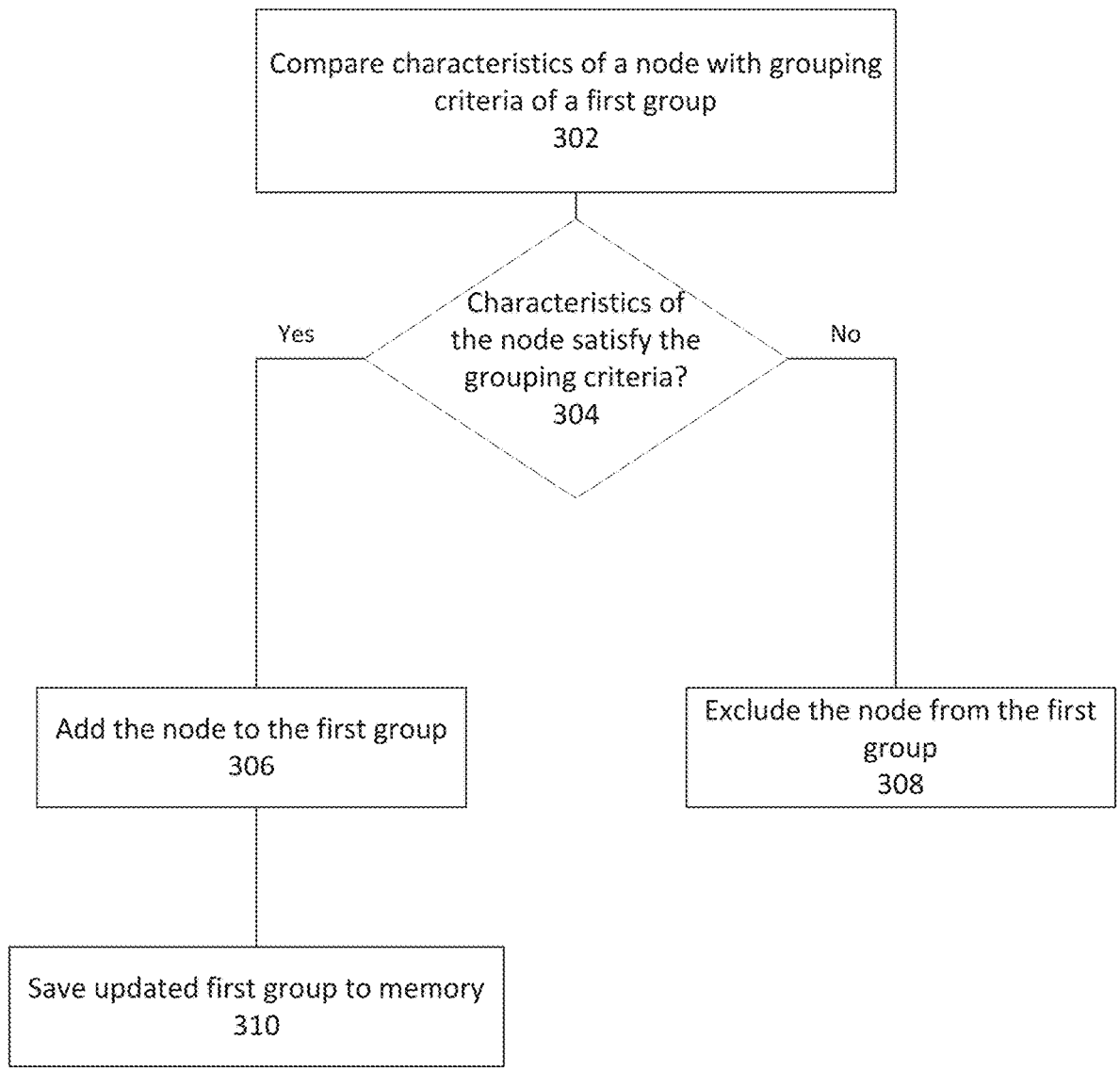
FIG. 3 is a flow diagram illustrating exemplary methods for grouping nodes based on grouping criteria.

With reference to FIG. 1, node aggregator component 102 may comprise any combination of software and hardware elements. In one embodiment, node aggregator component 102 comprises computer implemented instructions 214 stored in memory 212 executable on processor 202. As illustrated in element 302 of the flow chart of FIG. 3, node aggregator component 102 acquires node characteristics and grouping criteria from a memory element, such as memory element 212, a communication channel or another component of the system. In one embodiment, node aggregator component 102 receives instructions to access the characteristics stored within memory 212 for a node. Node aggregator component 102 may also receive instructions as to a particular node for which characteristics should be obtained or provided with or directed to a list of a nodes with memory 212, for which the characteristics should be obtained. The instructions may also instruct the node aggregator component to access grouping criteria for a first group from memory 212. In another embodiment, the node characteristics are provided to node aggregator component 102 via a communication channel. In such an embodiment, node aggregator component 102 may receive data instructions from processor 202 to access one or more network devices via the communication channel to obtain the characteristics. Node aggregator component 102 may be further instructed to access a network device via the communication channel to obtain the grouping criteria. In one embodiment, the grouping criteria is provided by a user via interface component 104. A user may select the grouping criteria using an input device coupled to an input adapter and interface component 104 may then provide the grouping criteria to the node aggregator component 102. In other embodiments, a user may also select the nodes to be grouped and that information is provided to node aggregator component 102.

Groups may be formed based on a wide variety of criteria. Criterion may be used individually (i.e., one criterion at a time) or a set of criteria can be used simultaneously. In those embodiments employing the simultaneous use of criteria, the criteria may be merged into a single criterion such that a node may be determined to satisfy the criteria if each criterion in the set is satisfied. Node aggregator component 102 may group the nodes based on whether or not they satisfy the criteria. For example, nodes that satisfy a first set of criteria and require network bandwidth above 75 Mbps may be grouped into a first group and nodes that do not satisfy the first set of criteria and require network bandwidth less than 75 Mbps may be placed into a second group. In one embodiment, node aggregator component 102 determines whether or not the characteristics of the node satisfy the grouping criteria of the group as shown in element 304. Node aggregator component 102 compares each criterion of the criteria to determine if there is a characteristic that satisfies the criterion. If the criteria is satisfied, the node is added to the group, and the updated group is saved to a memory element, such as memory 212 as shown in element 306 and 310 of the flow chart. If the criteria is not satisfied, then the node is excluded from, not added to, the group as shown in element 308 of the flow chart. In various embodiments, for a node that fails to satisfy the criteria of a first group, node aggregator component 102 may compare the characteristics of the node to the criteria of a second group to determine if the node satisfies the criteria of the second group, and if it does, add the node to the second group. If not, node aggregator component 102 may compare the characteristics of the node to the criteria of additional groups to determine a grouping to which the node should be added. In various embodiments, one or more nodes may be added to more than one node grouping.

The criteria is determined to be satisfied when each criterion in the criteria is satisfied. In one exemplary embodiment, the comparison of characteristics and criteria may be quantified as a Boolean, taking values of "True" or "False." For example, when a characteristic is deemed to have satisfied a criterion, a value of "True" is produced and when the characteristic is not deemed to have satisfied a criterion a value of "False" is produced. As such, a vector of Boolean values may be produced between each node and group based on a comparison of the grouping criteria and node characteristics. In one embodiment, a criterion may correspond to a threshold value and the characteristic is determined to have satisfied the criterion when it has satisfied the threshold value. In various embodiments, where there is more than one criterion, all criterion must be satisfied for the criteria to be considered to be satisfied. As such, the criterion may be a value from a specific set of values. For example, when the value is a geographical region, a criterion may be determined to be satisfied by first selecting a member of the set and then comparing that to the characteristics. For example, if the possible values for geographical region are US, Europe, and Asia, then the criterion is satisfied if the characteristics of the node matches any one of the regions, US, Europe and Asia. If it matches none, then it is not satisfied.

Criterion may corresponds to values in a set, such as when the criterion forms a graph and the nodes are vertices of the graph, the criterion is used to determine whether an undirected edge exists between two nodes. Once the graph is defined, the connected components of the graph can be determined, where each node belongs to a specific connected component. In one embodiment, criteria generation component 108 may be used to select a particular component such that a node may be determined to have satisfied the criterion when the node is determined to belong to the selected connected component. When the node is determined to not belong to the selected connected component, a value of "False" is returned and when it is determined to belong, a value of "True" is returned.

Figure 4:
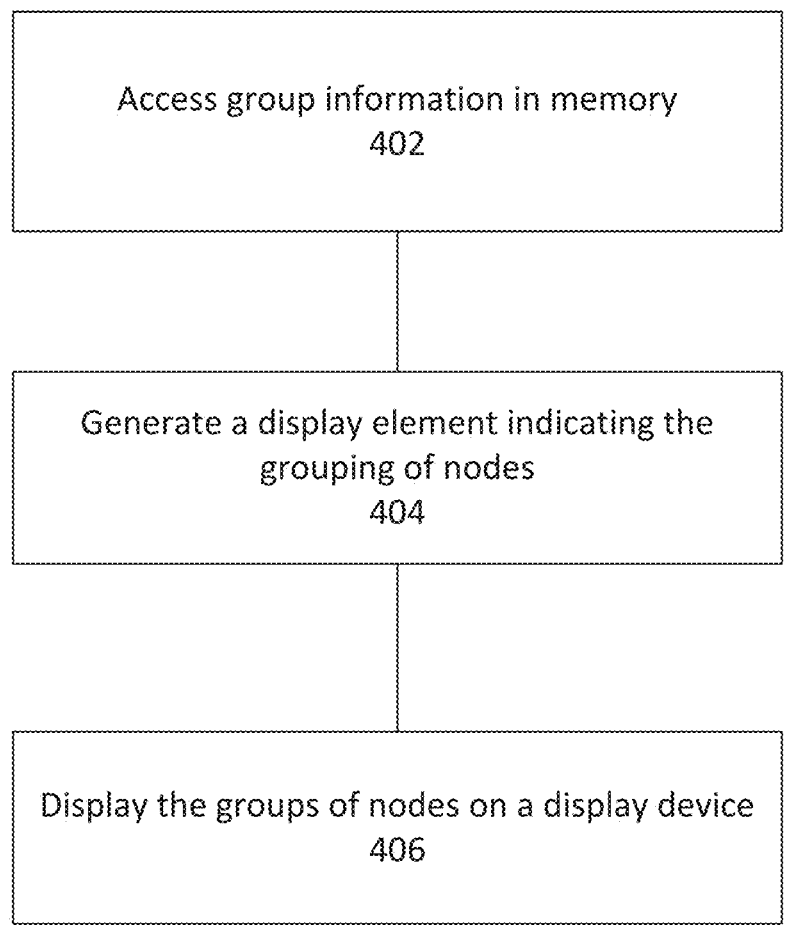
FIG. 4 is a flow diagram illustrating exemplary methods for displaying nodes on a display device.
Figure 5:
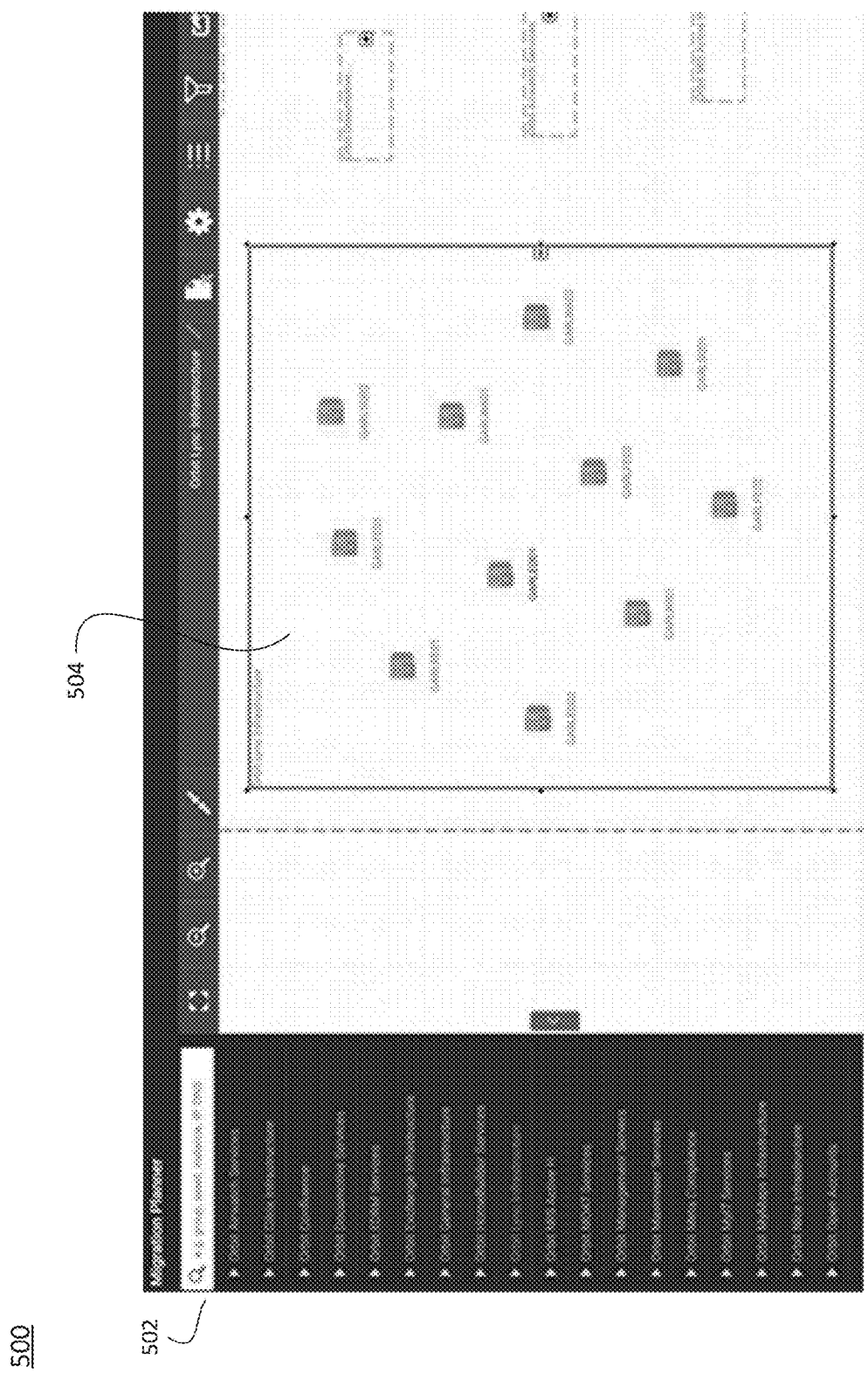
FIG. 5 illustrates exemplary element for a graphical user interface for displaying nodes within a selected group.

Node aggregator component 104 saves the updated grouping information within a memory element such as memory 212. Any format that may be accessed by other components of the system may be used. In one embodiment, the groupings are saved within a database of memory 212 that is accessible by interface component 104. As is shown in element 402 of flow chart 400 in FIG. 4, interface component 104 accesses the group information within a memory element, such as memory element 212. Interface component 104 may search a database within memory 212 to identify which nodes were determined to have satisfied the criteria the different groups, as indicated by element 404 of FIG. 4. Once the nodes and corresponding groups are identified, the interface component 104 generates a display element for a graphical user interface (GUI) to be displayed on display device 208, as indicated by element 406 of FIG. 4. The display element provides an indication as to which nodes are part of which groups. FIG. 5 illustrates one exemplary embodiment, where GUI window 500 comprises GUI element 502. As is illustrated, a group of nodes, 502, corresponding to selected criteria is displayed. In other embodiments, other formats may be used. For example, a list of nodes may be displayed such that each node is highlighted or colored based on which group the nodes belong. For example, each node that is part of the first group may be highlighted when displayed on a display device with a red color and each node that is part of a second group may be highlighted when displayed on a display device with a blue color. In yet another embodiment, the nodes may displayed within a table with an indication as to what group they belong. For example, each column of the table may represent a different group.

Figure 6A:
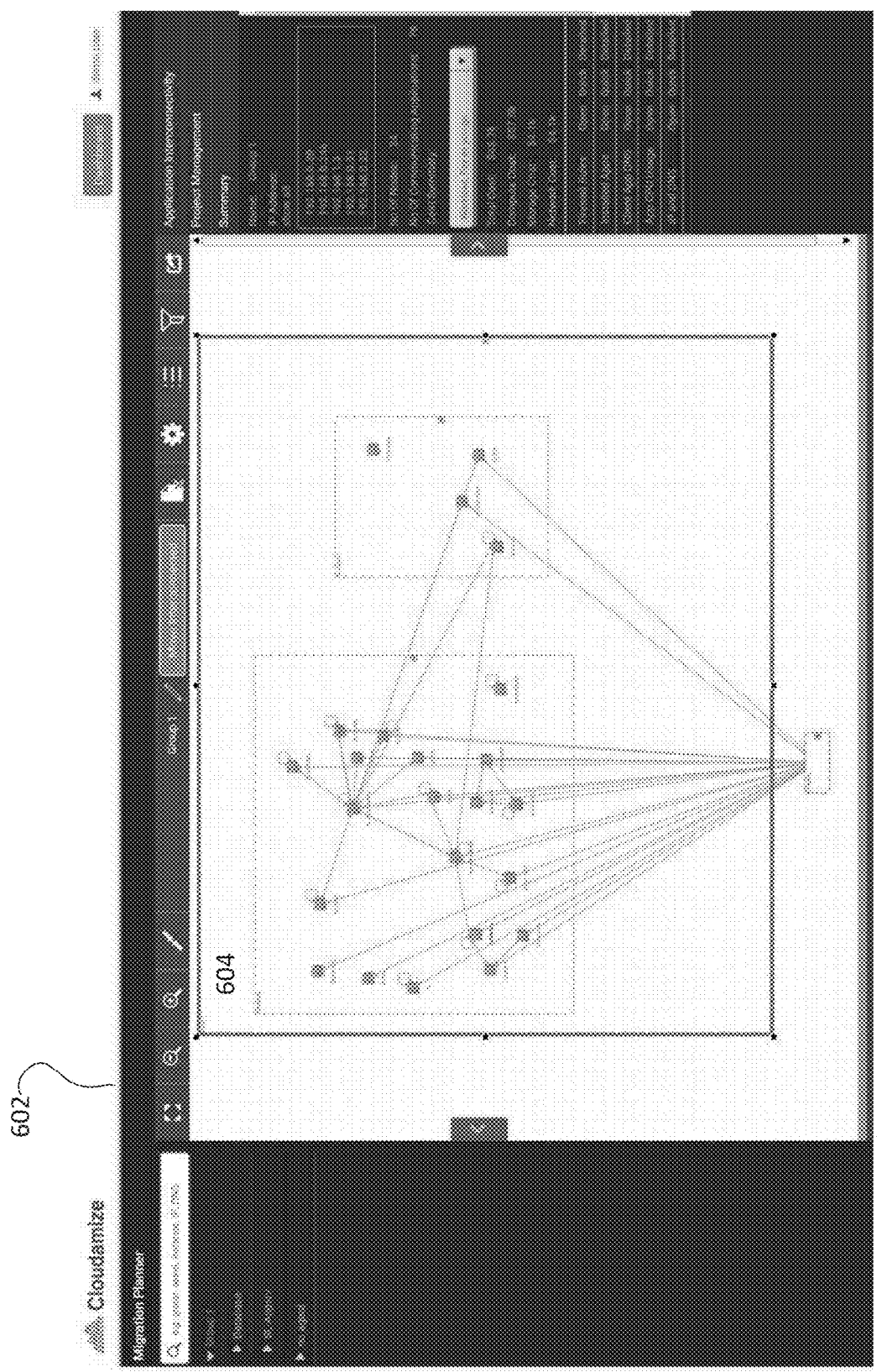
FIGS. 6a-6c illustrate an exemplary embodiment for a graphical user interface displaying relationship between nodes of a group.
Figure 6B:
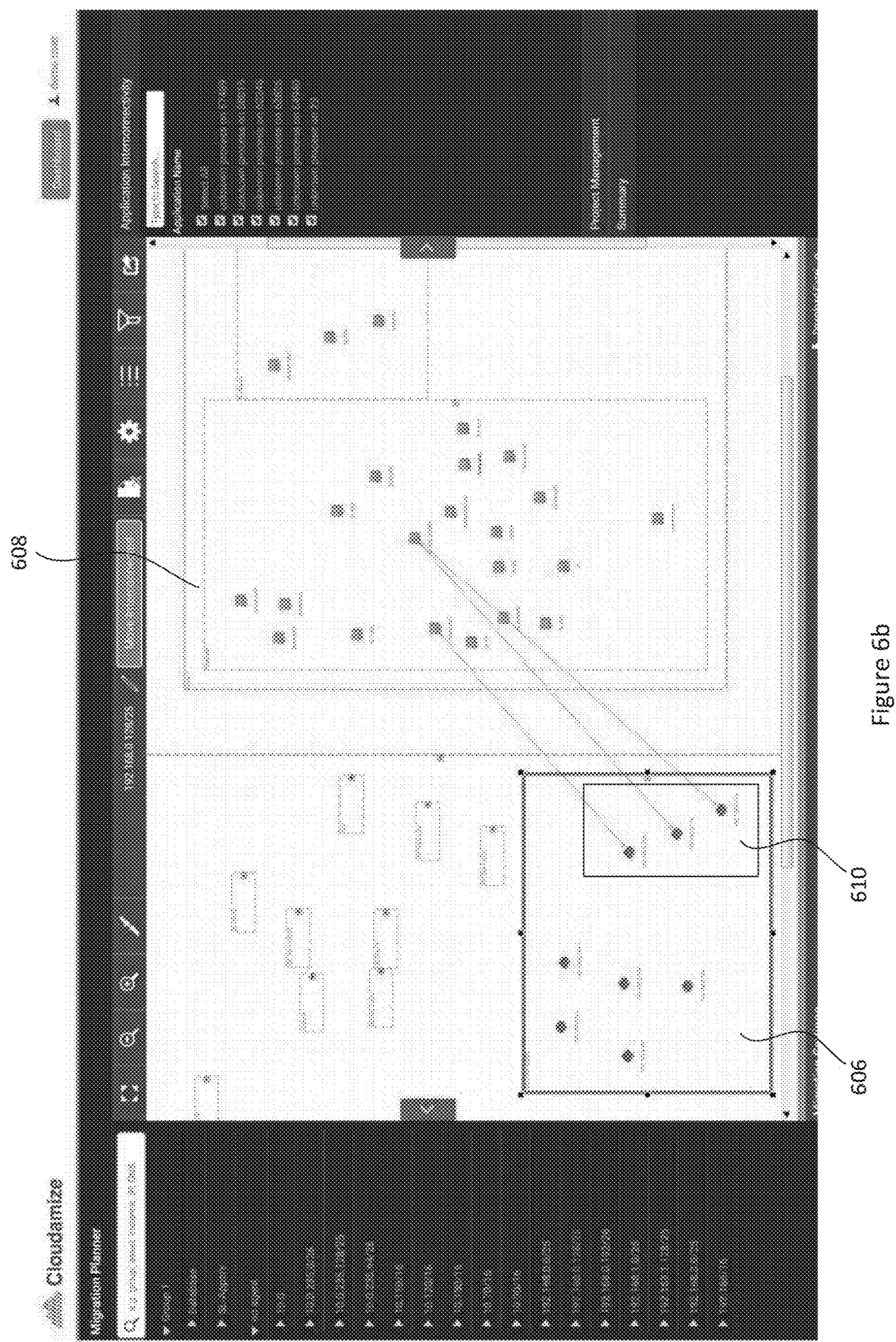
Figure 6C:
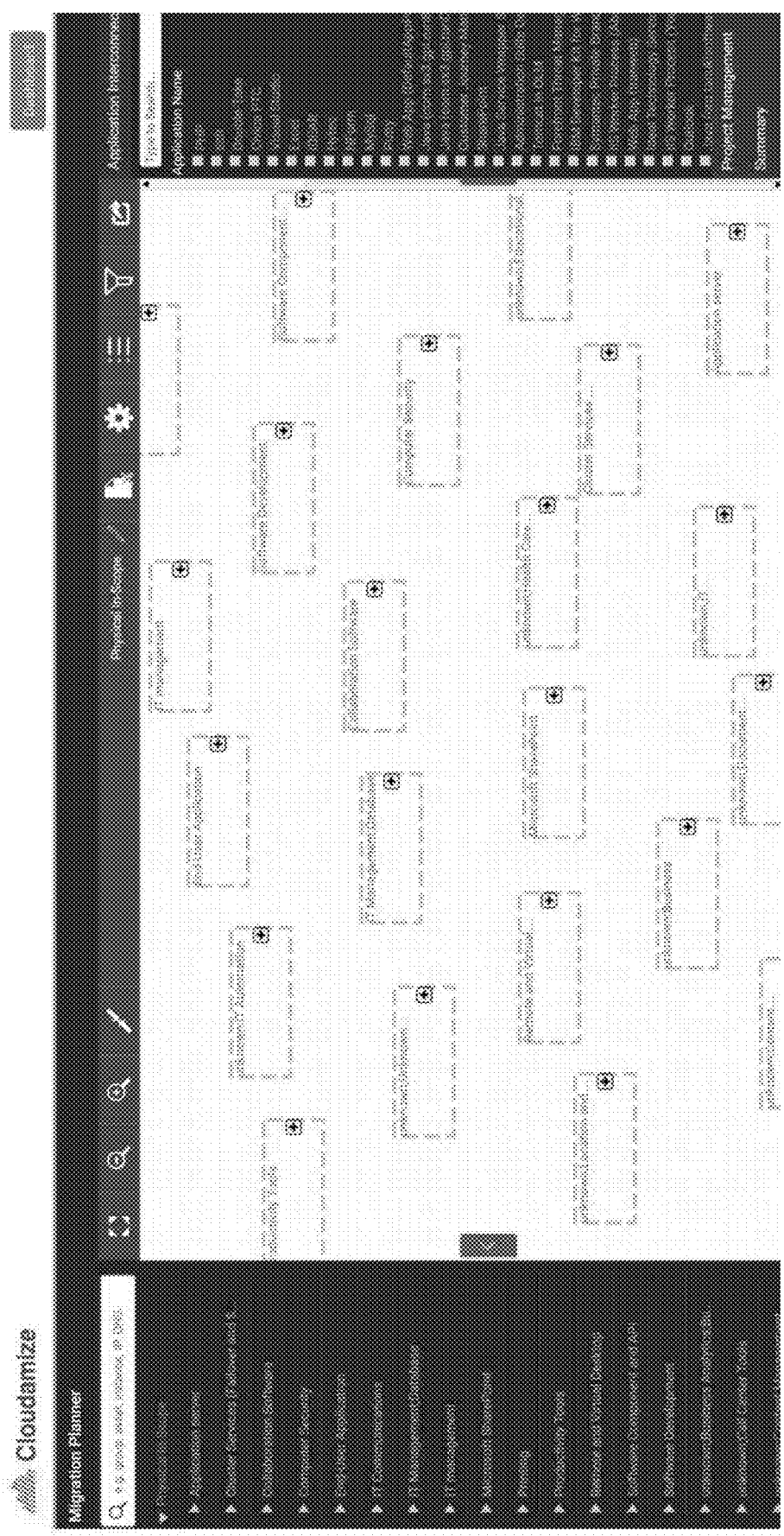

FIGS. 6*a*-6*c* illustrate an exemplary embodiment of grouping nodes. FIG. 6*a* illustrates the interconnections between different nodes within a group. In display element 602, nodes belonging to a common group, Group 1, are displayed, as shown at 604. The relationships for each node are indicated by an arrow, indicating where nodes are interconnected and/or share one or more commonality. In various embodiments, interconnected nodes may be grouped within a common grouping even though one or more node may have at least one characteristic that differs from the characteristics of the other nodes within the grouping. For example, as illustrated in FIG. 6*b*, nodes 608 have an installed agent (application) and nodes 606 lack the agent. However, nodes 610, while lacking the agent, are interconnected with nodes 608 and may be grouped with those nodes based on that interconnection. In such a grouping, the characteristic used to group nodes 608 and 610 is a shared communication or interconnection characteristic. FIG. 6*c*, illustrates groups of nodes that are compiled (or grouped) based on an application class. Each group comprises one or more nodes sharing a common application class. For example, a "Computer Security" group comprises nodes with computer security software.

In various embodiments, a user may interact with interface component 104 to select the criteria used to group the nodes. For example, interface component 104 searches memory 212 to obtain a list of criteria and sends instructions to display device 208 via processor 202 and bus 204 to display a display element by comprising the criteria that may be selected for grouping the nodes to be displayed on display device 208. The criteria may be displayed within a table or in some other list format. A user may use a mouse coupled to the node grouping system through interface adapter 206 to identify which criteria are to be used with the different groups. The user may drag each criterion into a field of each group to generate the grouping criteria for each group. In other embodiments, users may use other input devices and/or methods to create the criteria for each group. Interface component 104 saves the grouping criteria in memory 212 where it may be accessed by node aggregator component 102 and other components of the node grouping system 100.

Figure 7A:
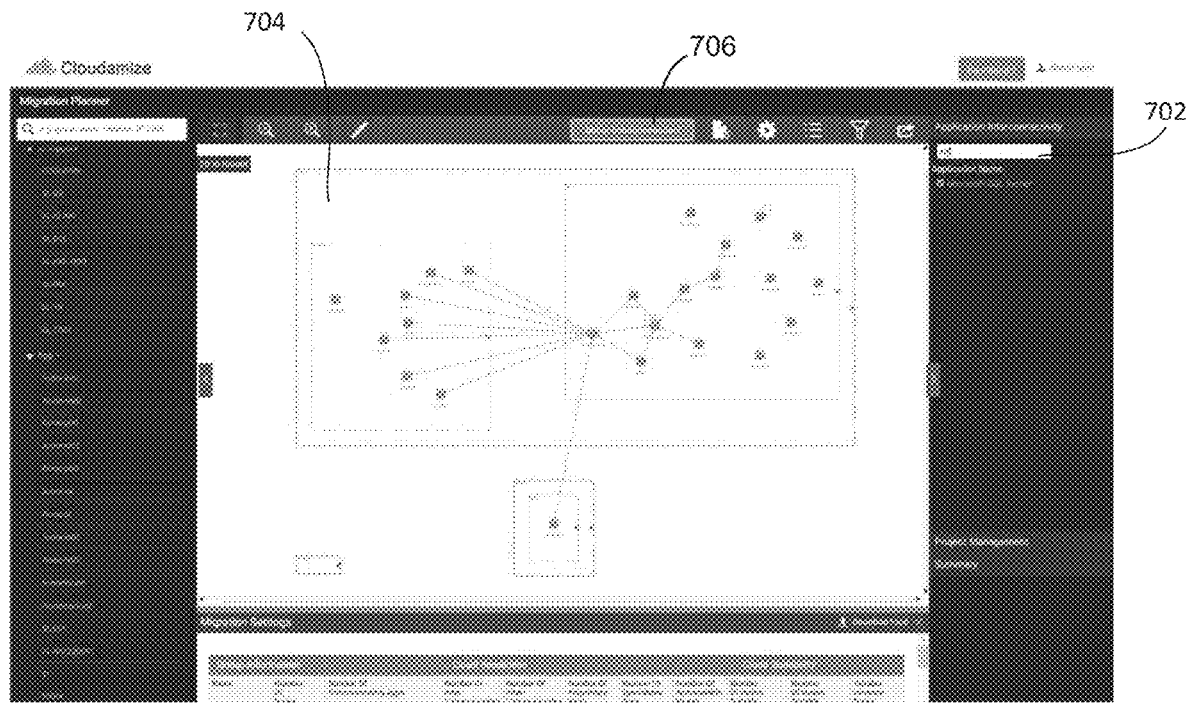
FIGS. 7a and 7b illustrate two exemplary stages of a node grouping process.
Figure 7B:
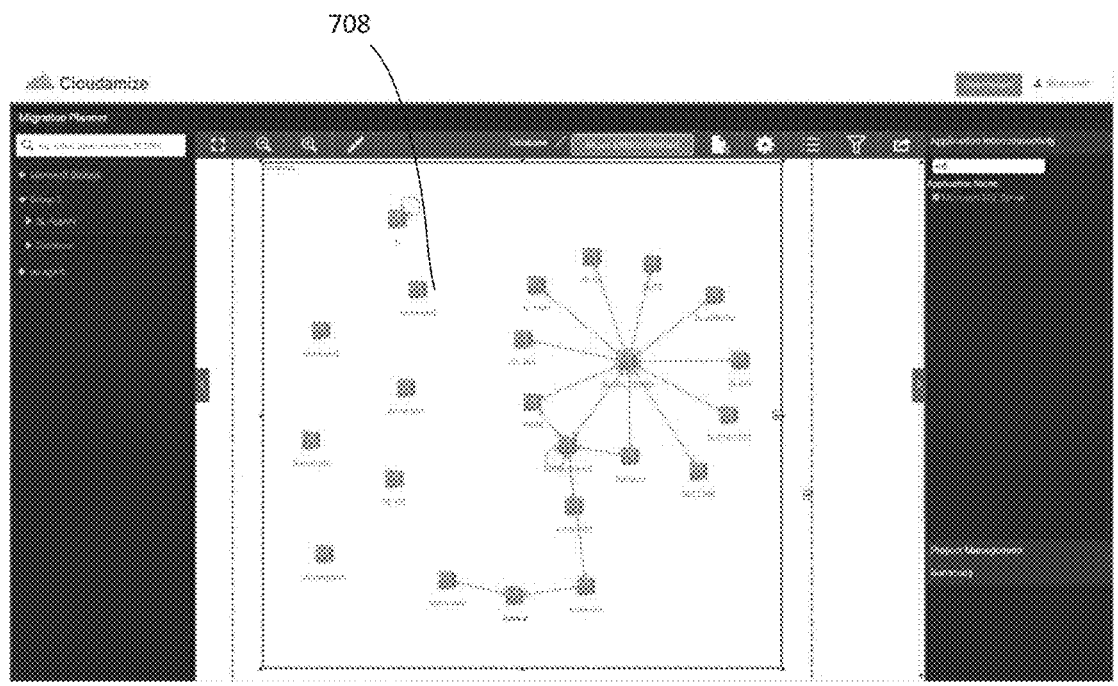

In various embodiments, a user is able to define a specific set of criteria to be applied to each group through interface component 104. For example, if the "Classification of the applications or applications that run on the node criteria" is selected, then a list of application classifications is displayed and the user can select from elements in the list. The user may further be able to select whether specific application classifications are included or excluded in a grouping. For example, if the application classification "Database" is selected, then the user can form a group where nodes have software classified as "Database" or where nodes do not have software classified as "Database". FIG. 7*a* shows a particular example of user-defined groups. In the example of FIG. 7, a user enters a search term into field 702 and the resulting nodes are displayed with their interconnections, as shown at 704. Node grouping system 100 may search the nodes and determine which nodes comprise a characteristic matching the searched criterion and determine the interconnections of those nodes, which nodes are connected to each other. Node grouping system 100 may then update the display element of the GUI window with the nodes and the corresponding interconnections for display on a display device. The user is able to provide instructions to group the interconnected nodes by clicking on button 706. Node grouping system 100 receives the instructions, groups the nodes and updates the display element for display as shown in element 708 of FIG. 7*b*.

The characteristics and criteria may comprise, but are not limited to, a measure of the difficulty and suitability to migrate the node, the number of virtual machine hours required when scale-out is used and the number of virtual machine hours when scale-out is not used, the cost when service provider's "bursty" storage feature is used and the cost when the service provider's "bursty" feature is not used, the number of geographic regions each node needs to provide services to, the fraction of time each node was observed to be running, the set of software programs installed on each machine, predicted cost of running the node on a publicly available cloud, the cost of running the node on private data center, process utilizations, network utilization, memory utilization, storage utilizations, geographic location of each node, public and private IP address of each machine, information regarding client and server processes, information regarding which client processes communicate with which server processes, a classification of each process running on each machine, communication requirements between nodes, characteristics of communication between nodes, start and end times of TCP connections including an indication of when data is sent over each connection, security requirements for each node, names of machines including fully qualified domain names, processor information for each machine including the manufacturer and model, tags or labels that the user has assigned to the machines, applications and nodes and the like. In one embodiment, the characteristics and criteria may be determined by an external computer system by analyzing the nodes of the target computer system and stored within memory 212 via a communication channel or node grouping system 100 may communicate with the external computer system via the communication channel to obtain the characteristics and criteria. In other embodiments, an external computer system may use an API and/or operating system function calls to identify the information needed to determine the characteristics for each node. Node grouping system 100 may access that information either via a communication channel or from memory 212 and determine the characteristics from that information. For example, node grouping system 100 may determine geographic location for a node based on the nodes IP address. In other embodiment, the node grouping system 100 may analyze the nodes of the target computer system to obtain information about the nodes which may then be used to determine the characteristics and criteria. For example, node grouping system 100 may use an API or another operating function call to obtain a list of applications and corresponding information within a particular node. Node grouping system 100 may also search one or more external sources via a communication channel to determine additional information regarding the application and use all of the available information to determine the application type (is it a database application) and version which may be used as characteristics and criteria.

In various embodiments, characteristics and/or criteria are processed by criteria generation component 108 such that a Boolean value can be produced when the characteristics are compared with the criteria. In various embodiments, where a criteria is a numerical value, criteria generation component 108 may convert the numerical value to a threshold such that a Boolean value can be determined through a comparison with the characteristics. In one embodiment, a user may set the threshold value. In one embodiment, the criterion takes values in a set, the criterion may be converted to a Boolean-valued criterion by selecting a single element of the set of possible values. Further, to form multiple groups, a single element from each of the possible values the criterion can take is automatically selected. For example, suppose that two criterion are used, specifically, whether the node uses a database application (which is a criterion from the class Classification of the applications or applications that runs on the node) and the Geographical Region where the geographical region takes values in the set US, Europe, Asia. In this case, six groups are formed, namely, nodes in the US that use a database application, nodes in Europe that use a database application, nodes in Asia that use a database application, nodes in the US that do not use a database application, nodes in Europe that do not use a database application, and nodes in Asia that do not use a database application. Further, criteria that is represented in graphs can be converted into criteria that take a value in a specific set. Further still, these criteria can also be used to automatically generate several groups. For example, by treating each node as a vertex in a graph and a dependency between two nodes as an undirected edge in this graph, then nodes can be grouped based on the connected component of the graph, that is, two nodes can be grouped if they are in the same connected component. These criteria do not necessarily need to consider all dependencies, but can also consider a subset of dependencies, for example, dependencies from specific classes of applications. The Boolean value may be whether or not the node is in a specific path, "True" if it is, and "False" if it is not.

In one embodiment, the grouping criteria and/or the characteristic information for each node may be ranked based on a perceived importance of the characteristic or criteria. Perceived importance may be related to the ability for a node to function correctly if that characteristics was not available in a new infrastructure. For example, a node may have characteristics that include high processor utilization and high network bandwidth requirement, but the node will fail to operate properly without high processor utilization, and that characteristic may be ranked higher than high network bandwidth. The grouping criteria and/or node characteristics may be pre-ranked, such that it is ranked before it is received by node aggregator component 102 or node aggregator component 102 may rank the grouping criteria and/or node characteristics once it is received. Node aggregator component 102 may store the ranked grouping criteria and/or node characteristics within memory 212 for future reference. The grouping information may be determined based on the ranking information for the nodes and/or groups. For example, the grouping information may associate a node with a particular group when the highest ranking characteristic of the node matches a criteria of a group. Further, the grouping information may associate a first node with a second node when they both have a highly ranked characteristic that are aligned with a particular grouping criterion. The grouping information may be based on the highest possible ranked match for a node which may not include the highest ranked node characteristic. In various embodiments, the ranking information may be applied to the grouping information after the grouping information have been determined to update the grouping information.

A node's ability to use a specific feature after migration may be determined based on whether a node is able to utilize a feature of a selected infrastructure, such as a specific cloud computing service. Examples of suitability to make use of a specific feature include the following "bursty" processor "CPU" usage. Some cloud computing services are able to provide considerable savings for "bursty" usage as compared to continuous usage. For example, in the cloud, one can dynamically "scale-out" the node's computing capability. This means that virtual machines are added and removed from a cluster of virtual machines that provides the node's computing capability. The result is that when scale-out is used, the number of virtual machines running changes frequently. A separate system predicts the number virtual machines hours that would be consumed when scale-out is used as well as when scale-out is not used. A ratio of the number of virtual machine hours when scale-out is used to the number of virtual machine hours when scale-out is not used may be determined. This ratio quantifies one aspect of the degree to which the node is suitable for migration.

As with bursty CPU usage, public clouds can provide cost savings when disk usage is bursty. The degree to which a node can make use of this feature is quantified by computing the ratio of the cost when the cloud provider's bursty storage feature is used and the cost when the cloud provider's bursty feature is not used.

Global service feature of the new infrastructure may also be explored. For example, since many cloud computing systems have data centers around the world, nodes that provide global services are excellent candidates for using the cloud. By monitoring the IP address of machines that access the node, it is possible determine whether the node provides a global service. This suitability can be quantified by computing the number of geographic regions the nodes need to provide services. Further, many services offer substantial cost savings for nodes that are only sporadically running and such nodes are highly suitable for a cloud processing system. This suitability can be quantified by the fraction of time the nodes are running.

The availability of services may also be used as criteria and characteristics to group nodes. As such, nodes can implement behaviors that could also be achieved through services offered from a different vendor. These criteria include rules that allow nodes to be grouped together based on whether they could utilize services provided by a vendor. As a specific example, nodes might use the software Microsoft SQL Server. Microsoft Azure SQL is a service that can be used to replace Microsoft SQL Server. These criteria allow nodes to be grouped as to whether they use Microsoft SQL Server and therefore could utilize Microsoft Azure SQL. These criteria include a single criterion for each service the cloud provider offers. Determining whether a node can use the service is performed as follows. Generally, a node can use a specific service if the node has features such as if the node has a specific software installed. For example, the Azure SQL service can be used by nodes that have Microsoft SQL Server software installed.

Predicted cost may also be used as a characteristics and criteria for grouping nodes. The predicted cost may be the predicted cost for computing (e.g., the predicted cost of using the virtual machine from the cloud service provider), the predicted cost for storage (e.g., the predicted cost that the cloud service provider would charge to accommodate the node's data storage), or some other cost, or a combination of costs.

Further, process resource utilization may be used as characteristics and criteria. For example, Some nodes might have low average CPU utilization (averaged over some period). These criteria can group together nodes that have low CPU utilization. Criteria in this class also includes grouping together nodes that have high CPU utilization, high memory utilization, high storage IO utilization, and similar criteria.

Node running behavior may be included as possible characteristics and criteria used to group the nodes. The running behavior corresponds to when a node is active. For example, some nodes might only be turned on during a fraction of a day, or only consume significant compute resources for a fraction of the day. This would allow groups to be formed based on the fraction of time the nodes could be turned off without significantly impacting the performance of the application. In embodiment, node grouping system 100 computes the probability that the processor utilization exceeds a threshold for any period during each hour of the week based on information received from a local memory or provided by an external computer system via a communication channel. For example, suppose that ten weeks of data have been collected. For each week, it is determined if the processor utilization (smoothed over some window, such as a five minute window) exceeds the threshold during the hour Sunday 12:00-1:00. The probability of exceeding the threshold during the hour Sunday 12:00-1:00 is the number of weeks where it was observed that the processor utilization did exceed the threshold during the hour Sunday 12:00-1:00 divided by ten (since there are ten observations of the hour Sunday 12:00-1:00). A second threshold is used to determine when the node can be turned off. If the probability that the CPU utilization exceeds the threshold is lower than this second threshold, the hour is marked as suitable for turning off the node. In one embodiment, one weekly schedule declares that the node should be turned off when the hour is marked suitable to turn off the node and another weekly schedule declares that the node should be turned off when the hour is marked as suitable to be turned off and this hour is part of a string of a number of other hours that are also marked as suitable to be turned off. Daily schedules may be used in addition to or instead of weekly schedules. The daily schedules may be determined using the same process as applied to the weekly schedules, but only behavior over a 24 hour period is determined. It is further possible to use schedules that correspond to other parts of days. For example, it would be possible to apply a "nightly schedule", that considers only a portion of the daily hours and corresponds to a night time period. Other portions of the day may be used as well. Further, the schedules may be based on multiple days, such as a weekend schedule, but other time periods are possible as well.

Further, characteristics and criteria may be based on geographic region and/or corresponding data center. The IP address may be used as characteristics and criteria to group the nodes. For example, criteria for forming a group could consider whether an IP address of the node belongs to set of IP addresses. The data center or geographic region may be provided by manual input or can be automatically detected by examining the public IP addresses of the nodes. In some cases, the machine does not have any direct access to the public Internet, instead, a proxy is used communicate with the public internet. In this case, the IP address of the proxy is used to estimate the city and country where the node is located. Criteria for forming a group could consider whether an IP address (or addresses) of the node belongs to set of IP addresses. For example, nodes could be grouped based on their /24 subnet address, which would result in all nodes with IP address in the prefix 192.168.1.0/24 being grouped together. Note that the quantities used in these criteria take values in a specific set. For example, the /24 subnet address takes values in a specific set.

Classification of the applications or applications that run on a computer system within the node may be used as characteristics and/or criteria. A software application can be classified by the vendor, e.g., all applications made by Citrix. Alternatively, software applications could also be classified based on the objectives of the application such as an email application, an application that focuses on security, or applications for developing software. These criteria utilize a mapping from the software vendor name and/or the name of the software product to the application class.

Characteristics and criteria may also be based on the dependency between applications and nodes. In various embodiments, software applications can be composed of several components. These components can run on different nodes. As a result, the nodes need to communicate with other nodes. These communication requirements result in interdependencies between nodes. By treating each node as a vertex in a graph and a dependency between two nodes as an undirected edge in this graph, nodes can be grouped based on the connected component of the graph, that is, two nodes can be grouped if they are in the same connected component. These criteria do not necessarily need to consider all dependencies, but can also consider a subset of dependencies, for example, dependencies from specific classes of applications.

Communication requirements may be used as criteria and characteristics. For example, communication between nodes might have some important characteristics such as delay (latency), bit-rate, the number of networking connections, or connections to shared storage systems. Grouping criteria can include different communication characteristics and requirements. For example, two nodes (or applications) would be in the same group if the nodes (or applications) require high bit-rate communication between the two nodes (or applications). Another example is where two nodes (or applications) would be in the same group if they are sharing storage resources, like a shared drive (e.g., with SMB of NFS), and hence require high bandwidth communication to the same resource. In one embodiment, the communication requirements can be Boolean valued by criteria generator component 108, such as the "communication between two nodes must have low latency," or numerical-valued, such as data-rate required between the two nodes. In the case that the numerical data rate requirement is converted to a Boolean valued requirement with a threshold. For example, "high bandwidth communication" is set to mean a data-rate requirement that exceeds 75 Mbps. Once Boolean-valued requirements are determined, a graph can be formed where each node is a vertex and undirected edges exist between nodes that have a particular communication requirement. Nodes may then be grouped together if they are in the same connection component.

The node characteristics and grouping criteria may also include information corresponding to connections between nodes such as the duration and activity of the connection. A particular example of a communication requirement criteria is a long-lived but low data-rate communications. Long-lived connections that send little data are often incorrectly terminated by network components such as firewalls. These criteria allow nodes with this type of communication to be grouped together so that the network topology for these nodes is such that their communication does not pass through a device that could prematurely terminate connections. In one embodiment, in order to determine if two nodes require long-lived but low data-rate communication, node grouping system 100 uses data collected about network usage and the start and end times of TCP connections. A long-lived with low data-rate can be detected by searching for periods of time where no data was sent over an open TCP connection, where the duration of the period of time exceeds a given threshold. If such a TCP connection is found, then the nodes require long-lived but low data-rate communications, and can be grouped together.

Different nodes can have different or similar security requirements and as such, the security requirements may be used as node characteristics and grouping criteria. Security requirements correspond to requirements that nodes be in (or not be in) the DMZ, nodes meet specific security standards, nodes be isolated from a set of nodes, requirements that the nodes run on physical machines that have characteristics such as be dedicated physical machines so that the physical machine's resources are not shared with any other node, the nodes have specific geographical requirements such as they must be physically located in a specific country. Further, in addition to security requirements on nodes, there can also be security requirements on the communication between nodes such as that the communication between nodes must not pass through a firewall or must never leave a data center. Security requirements can also exist for the storage system used by the node, such as whether the storage system must be encrypted or utilize specific type of redundancy or reliability. In one embodiment, the security requirements are provided to the disclosed system via an external system via a communication channel.

Information pertaining to the applications and/or hardware vendor may be used as node characteristics and/or grouping criteria. This may include factors such as whether the programs that run on the nodes or that make up the application (or components of the application) are developed by well-established vendor (such as Microsoft) or developed by a less well-established software vendor or developed by the developers within the organization. These criteria can also include factors such as which programming languages are used as well as what components are used. For example, the grouping can be based on whether Microsoft SQL is used as one of the components of the application. Additionally, information corresponding to whether the software used in the node is the latest version or if the version is so old that the vendor no longer provides support may be used as node characteristics and/or grouping criteria. In one embodiment, a software version may be determined to be so old that the vendor no longer provides support and where the out-of-date software has an important defect such a security flaw or is missing an important feature that is available in the more recent version. Whether software is out-of-date or not may be provided via separate system through a communications channel. determines whether the software is out-of-date. In one embodiment, node grouping system identifies the current version of the software and retrieves documents such as product release announcements from the Internet, determine the version number of the latest version. Similarly, this other system can retrieve documents from the Internet that announce security vulnerabilities.

Names or parts of names for applications and/or hardware in the nodes may be used as characteristics and/or criteria to create the groups. The node names can be the machine name, which is an attribute that can be determined from various system calls on the node. The node name can also be the fully qualified domain name (FQDN). Note that a node can have many names, these criteria includes comparison to one or many of these names. Beyond string comparison, these criteria also include regular expression matching. Also, these criteria include names of other applications, users, and file names.

Characteristics and/or criteria to associate the nodes may also include information related to the age, performance, and efficiency of the hardware. For example, these may include the release date of the processor where the node is running, and the energy efficiency of the computing system where the node is running. These may also include the relative performance of where the node would be migrated to. For example, when considering the energy efficiency of the node, it also considers the energy efficiency of where the node could be migrated. Node grouping system 100 may evaluates the energy efficiency by determining the TDP (Thermal Design Power) of the CPU, which is a quantity provided by the CPU vendor and estimates the power usage of the CPU. Along with the TDP, the computational ability of a CPU can be determined. Various publically available metrics may be used, such as Passmark, to quantify the computational abilities of a CPU. The ratio of the computational ability and the TDP can be used to quantify the energy efficiency of the CPU. For age-based criteria, the release date of the CPU used by each node is determined.

Further, characteristics and/or criteria to group the nodes criteria may be based on information that a user has supplied such as a tag on the node, where several tags can be assigned to each node. These criteria form groups based on a selected subset of tags. Further, whether or not a node was selected by a user may be used as a characteristic or criteria to group the nodes. In one or more embodiments, the grouping criteria may comprise a set of rules defining how the nodes should be grouped. For example, the grouping criteria may define that nodes having more than a predetermined number of matching characteristics should be grouped. Further, the grouping criteria may define that nodes that match highly ranked characteristics should be associated with each other.

The characteristics and criteria may be stored within memory 212 or maybe accessed from an external source via a communication channel. In one embodiment, one or more of the above characteristics and criteria are determined from the computer system by node grouping system 100.

The node grouping system may also utilize several mappings as criteria and characteristics. These mappings may include a mapping from each software vendor to whether the vendor is a well-established vendor, a mapping from a software product to the classification of the software product, a mapping from each software product and version to whether the software vendor still supports the version, whether the version contains any significant flaws such as a security bug or is missing a key feature that more current versions have, a mapping from IP address to geographic region and mapping from each CPU to a measure of the computational ability of the CPU and the TDP (Thermal Design Power) of the CPU.

In various embodiments, the node aggregator component 104 receives ranking information for each of the nodes and/or groups from memory 212 or via a communication channel. The ranking information may comprise ranked grouping criteria and/or ranked characteristics which may be used to alleviate any ambiguity regarding which group a node should be placed into. For example, when a node is determined to be equally aligned with multiple groups, a grouping ambiguity occurs for the node. The ranking information for either the grouping criteria and/or the node characteristics is analyzed and a node is associated with a group for which there is alignment of higher ranking criteria and/or characteristics.

As the nodes are associated with groups, the nodes may be reviewed to determine any possible incompatibilities that may exist between the nodes of the corresponding group. The incompatibilities may be based on the characteristics of the different nodes associated with the group. If an incompatibility is determined, one or more nodes may be associated with a different group. The node that is associated with a different group may be the node that is determined to be creating the incompatibility. An exemplary incompatibility may be a bandwidth requirement for a node that causes the required bandwidth for that group to exceed the available bandwidth. Further, an incompatibility may be created when a node that is scheduled to be active during a particular time period is added to a group where all other nodes are scheduled to be inactive during that time period. In one embodiment, an identified incompatibility may be used in the determination of whether or not a node should be added to a group. The incompatibility may be displayed to a user so that the user may take the incompatibility into consideration when making groups, or the incompatibility may be fed back into node aggregator component 102, where it may be used in the node grouping process.

In one embodiment, a user to creates and/or adjusts the node groupings by selecting desired node characteristics associated with each of the groups. As the characteristics are selected, a list of applicable nodes is provided. The user may then associate the desired nodes with each group. In one embodiment, a user may adjust the criteria used to create the grouping information and/or adjust the ranking of the characteristics of the node and/or the group criteria. The updated information may be provided to the node aggregator component 102 to update the grouping information.

In one embodiment, user interface component 104 generates a GUI window displaying the nodes such that a user is able to generate one or more groups of nodes. The interface component 104 may include the grouping information and/or the grouping metric for each node in the GUI window. In one embodiment, the interface component 104 generates a GUI window comprising the node characteristics and/or grouping criteria. As the user associates different nodes with different groups, the node aggregator component 102 may analyze the groups for possible incompatibilities and/or possible grouping optimizations. If any incompatibilities are identified within a group, interface component 104 may alert the user to the possible incompatibility. In one embodiment, interface component 104 highlights groups with possible incompatibilities. In another embodiment, interface component 104 may provide a message alerting the user to a possible incompatibility or group optimization to display device 208 for displaying.

Optional recommendation engine 106 automatedly develops and provides a migration or transition plan based on the node associations. For example, recommendation engine 106 receives and processes the node association information from memory 212 to generate the migration or transition plan. In one embodiment, recommendation engine 212 may receive additional information from memory 212 or via a communication channel to generate the migration or transition plan. This information comprises information characteristics for the programs within the various nodes. Information characteristics may correspond to process information, application information and/or system information for a computer system. In another embodiment, the information characteristics may additionally or alternatively refer to information identified within documents, video files, audio files, image files, websites and the like that correspond to programs of the nodes. Recommendation engine 106 processes node associations stored within memory 212 to suggest a service provider and/or infrastructure. Recommendation engine 106 stores this suggestion within memory 212 and/or provides the suggestion to interface component 104 to be displayed within a GUI window. In one embodiment, recommendation engine 112 may also determine the estimated cost and/or project duration information. The estimated cost and/or project duration information may be stored to memory 212.

In one exemplary embodiment, recommendation engine 106 suggests a cloud computing provider and service based on node associations stored within memory 212. Recommendation engine 106 provides the suggested cloud computing provider and service to Interface component 104 (either directly or through memory 212) to be displayed within a GUI window to a user. The displayed information may comprise one or more of the expected cost, project duration time frame and any possible issues that may be encountered. In such an embodiment, recommendation engine 106 may processes the characteristics of each node and the node associations and select a corresponding platform based on those requirements. Recommendation engine 106 may access service provider information directly from a service provider system via a communication channel or from information processed and stored within memory 212.

While certain embodiments according to the invention have been described, the invention is not limited to just the described embodiments. Various changes and/or modifications can be made to any of the described embodiments without departing from the spirit or scope of the invention. Also, various combination of elements, sets, features, and/or aspects of the described embodiments are possible contemplated even if such combinations are not expressly identified herein.

What is claimed:

1. A node grouping system for grouping a plurality of nodes of a target computer system, said node grouping system comprising:
   a processor;
   a memory operatively coupled to said processor;
   a criteria generation component comprising instructions stored in said memory and operable to cause said node grouping system, under control of said processor, to identify characteristics of nodes of said plurality of nodes by automatedly analyzing each node of said plurality of nodes to obtain said characteristics of each node that are relevant to migration of said plurality of nodes to a new computing system infrastructure;
   a node aggregator component comprising instructions stored in said memory and operable to cause said node grouping system, under control of said processor, to group said plurality of nodes by:
     comparing first characteristics, obtained by said criteria generation component, of a first node of said plurality of nodes with first grouping criteria of a first group of nodes within said plurality of nodes to determine if said first characteristics satisfy said first grouping criteria, said first grouping criteria comprising at least one of availability of services, a predicted cost, process resource utilization, corresponding data center, security requirements, application vendor information, hardware vendor information, application version information, hardware version information, at least a portion of a software name, at least a portion of a hardware name, and a classification of at least one application;
     grouping said first node with said first group of nodes based on a determination that said first characteristics satisfy said first grouping criteria and said first node does not have an incompatibility with said first group of nodes;
     storing said grouping within said memory; and
     outputting incompatibilities among nodes in said first group of nodes and feeding back said incompatibilities to said node aggregator component to re-group said plurality of nodes if said incompatibilities exist;
   an interface component comprising instructions stored in said memory and operable to cause said node grouping system, under control of said processor, to display said grouping comprising said first node; and
   a recommendation engine component comprising instructions stored in said memory and operable to cause said node grouping system, under control of said processor, to automatedly develop a migration plan, based on said characteristics obtained by said criteria generation component, for migration of at least one node that mitigates migration problems associated with migrating said at least one node to said new computing system infrastructure.

2. The node grouping system of claim 1, wherein said first grouping criteria are user supplied and wherein said interface component receives said first grouping criteria from an input device coupled to an input adapter of said node grouping system.

3. The node grouping system of claim 1, wherein said first characteristics for said first node are stored within said memory.

4. The node grouping system of claim 1, wherein said comparing said first characteristics with said first grouping criteria comprises comparing each criterion of said first grouping criteria with said first characteristics to determine that each criterion of said first grouping criteria is satisfied by a characteristic of said first characteristics.

5. The node grouping system of claim 1, wherein said node aggregator component is further configured to compare said first characteristics with second grouping criteria of a second group of nodes within said plurality of nodes to determine if said first characteristics satisfy said second grouping criteria.

6. The node grouping system of claim 5, wherein at least one criterion of said first grouping criteria is opposite to that of at least one criterion of said second grouping criteria.

7. The node grouping system of claim 1, wherein said comparing said first characteristics with said first grouping criteria comprises comparing said first characteristics with at least a one criterion of said first grouping criteria to generate a first Boolean value of "True" when said first characteristics satisfy said at least said one criterion.

8. The node grouping system of claim 7, wherein said node aggregator component is configured to generate a vector of Boolean values comprising said first Boolean value, wherein said vector comprises an entry for each criterion of said first grouping criteria.

9. The node grouping system of claim 1, further comprising a criteria generation component comprising instructions stored in said memory and operable to cause said node grouping system, under control of said processor, to generate grouping criteria for multiple groups wherein each group of said multiple groups comprises different grouping criteria.

10. The node grouping system of claim 1, further comprising a criteria generation component comprising instructions stored in said memory and operable to cause said node grouping system, under control of said processor, to convert criteria from a first format to a second format, wherein said second format is Boolean value format.

11. The node grouping system of claim 1, wherein said first node comprises a plurality of machines of said computer system.

12. The node grouping system of claim 1, wherein said first grouping criteria comprises a suitability of migration measure.

13. The node grouping system of claim 12, wherein said suitability of migration measure is based on a node's ability to utilize a feature of a selected infrastructure, wherein said feature is one of "bursty" processor usage, "bursty" storage usage, global service feature, and sporadic usage.

14. The node grouping system of claim 1, wherein said first grouping criteria comprises a communication requirement, wherein said communication requirement comprises one of a latency requirement, bit-rate requirement, number of networking connections and connections to shared storage systems.

15. The node grouping system of claim 1, wherein said first grouping criteria comprises at least one of a duration and activity of a connection between two or more nodes.

16. The node grouping system of claim 1, wherein said first grouping criteria comprises at least one of an age, a performance and an efficiency of hardware for a node.

17. The node grouping system of claim 1, wherein said first grouping criteria comprises node running behavior based on an operating schedule of a node.

18. A computer-implemented method for grouping a plurality of nodes of a target computer system using a node grouping system comprising a processor, a memory operatively coupled to said processor, a criteria generation component comprising instructions stored in said memory, and a node aggregator component comprising instructions stored in said memory, said method comprising:
said criteria generation component automatedly identifying characteristics of nodes of said plurality of nodes by automatedly analyzing each node of said plurality of nodes to obtain said characteristics of each node that are relevant to migration of said plurality of nodes to a new computing system infrastructure;
said criteria generation component automatedly generating grouping criteria for grouping nodes;
said node aggregator component automatedly comparing first characteristics of a first node of said plurality of nodes with first grouping criteria of a first group of nodes within said plurality of nodes to determine if at least one characteristic of said first characteristics satisfies said first grouping criteria;
said node aggregator component automatedly grouping said first node with said first group of nodes based on a determination that said at least one characteristic satisfies said first grouping criteria and said first node does not have an incompatibility with said first group of nodes;
said node aggregator component automatedly storing said grouping within said memory;
said node aggregator component automatedly outputting incompatibilities among nodes in said first group and feeding back said incompatibilities to said node aggregator component to re-group said plurality of nodes if said incompatibilities exist; and
automatedly develop a migration plan, based on said characteristics obtained by said criteria generation component, for migration of at least one node that mitigates migration problems associated with migrating said at least one node to said new computing system infrastructure.

19. The method of claim 18, wherein automatedly grouping comprises grouping a second node of said plurality of nodes with said first group of nodes within said plurality of nodes based on a determination that at least one characteristic of said second node satisfies said first grouping criteria and said second node does not have an incompatibility with said first group of nodes, and
wherein said first node and said second node share at least one characteristic, said at least one characteristic comprises at least one of a suitability of migration measure, availability of services, a predicted cost, process resource utilization, geographic region, corresponding data center, security requirements, application vendor information, hardware vendor information, application version information, hardware version information, at least a portion of a software name, at least a portion of a hardware name, a classification of at least one application, and a communication requirement,
wherein said communication requirement comprises at least one of a latency requirement, bit-rate requirement, number of networking connections, connections to shared storage systems, duration of a connection between two or more nodes, activity of a connection between two or more nodes, at least one of age, performance and efficiency of hardware for a node and node running behavior based on an operating schedule of a node.

20. A node grouping system for grouping a plurality of nodes of a target computer system, said node grouping system comprising:
a processor;
a memory operatively coupled to said processor;
a criteria generation component comprising instructions stored in said memory and operable to cause said node grouping system, under control of said processor, to automatedly generate grouping criteria for grouping nodes by automatedly analyzing each node of said plurality of nodes to obtain characteristics of each node that are relevant to migration of said plurality of nodes to a new computing system infrastructure;
a node aggregator component comprising instructions stored in said memory and operable to cause said node grouping system, under control of said processor, to group said plurality of nodes using said characteristics obtained by said criteria generation component by:
comparing first characteristics of a first node of said plurality of nodes with first grouping criteria of a first group of nodes within said plurality of nodes to determine if said first characteristics satisfy said first grouping criteria, said first grouping criteria being generated by said criteria generation component;
grouping said first node with said first group of nodes based on a determination that said first characteristics satisfy said first grouping criteria and said first node does not have an incompatibility with said first group of said plurality of nodes;
storing said grouping within said memory; and
outputting incompatibilities among nodes in said first group of nodes and feeding back said incompatibilities to said node aggregator component to re-group said plurality of nodes if said incompatibilities exist; and
a recommendation engine component comprising instructions stored in said memory and operable to cause said node grouping system, under control of said processor, to automatedly develop a migration plan, based on said characteristics obtained by said criteria generation component, for migration of at least one node that mitigates migration problems associated with migrating said at least one node to said new computing system infrastructure.

21. The node grouping system of claim 20, wherein said criteria generation component is configured to obtain said characteristics comprising interrelationships and associations among said plurality of nodes.

22. The node grouping system of claim 21, further comprising an interface component comprising instructions stored in said memory and operable to cause said node grouping system, under control of said processor, to display said grouping comprising said first node.

* * * * *